(12) United States Patent
Christensen et al.

(10) Patent No.: US 10,938,192 B2
(45) Date of Patent: *Mar. 2, 2021

(54) CABLE CLEAT ASSEMBLY

(71) Applicant: Panduit Corp., Tinley Park, IL (US)

(72) Inventors: Kenneth A. Christensen, Naperville, IL (US); Mateusz Kruzel, Orland Park, IL (US); Rodney G. Rouleau, Manhattan, IL (US); Brett J. Putnam, Plainfield, IL (US); Mark D. Campbell, Beecher, IL (US); Balaji Kandasamy, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,521

(22) Filed: May 30, 2019

(65) Prior Publication Data

US 2019/0379187 A1 Dec. 12, 2019

Related U.S. Application Data

(60) Provisional application No. 62/682,438, filed on Jun. 8, 2018.

(51) Int. Cl.
*H02G 3/04* (2006.01)
*F16L 3/23* (2006.01)
*F16L 3/10* (2006.01)

(52) U.S. Cl.
CPC .......... *H02G 3/0456* (2013.01); *F16L 3/1075* (2013.01); *F16L 3/23* (2013.01)

(58) Field of Classification Search
CPC .......... H02G 3/0456; F16L 3/1075; F16B 2/10
See application file for complete search history.

(56) References Cited

U.S. PATENT DOCUMENTS

| 587,775 | A | * | 8/1897 | Yockel | .................. | F16L 3/1066 |
| | | | | | | 248/75 |
| 2,915,096 | A | * | 12/1959 | Mooney | .................. | B25B 5/103 |
| | | | | | | 269/157 |
| 2,934,803 | A | * | 5/1960 | Allen | ........................ | F16B 2/10 |
| | | | | | | 403/245 |
| 3,893,813 | A | * | 7/1975 | Johnson | .................... | B01L 9/50 |
| | | | | | | 422/564 |
| 4,179,774 | A | | 12/1979 | Bradbury | | |

(Continued)

FOREIGN PATENT DOCUMENTS

| DE | 663592 | C | 8/1938 |
| FR | 714483 | A | 11/1931 |

(Continued)

*Primary Examiner* — Bradley Duckworth
(74) *Attorney, Agent, or Firm* — Christopher S. Clancy; James H. Williams; Aimee E. McVady

(57) ABSTRACT

A cable cleat assembly secures a bundle of cables to a ladder rack. The cable cleat assembly includes a base and two side bodies. Each side body is pivotally mounted to one of the ends of the base. Each side body has a first end, a middle section, and a second end. The first end of each side body includes a mounting member. The mounting member has a peg extending from each side of the mounting member. The pegs are mounted in the base to enable the side bodies to pivot from an open position to a closed position.

12 Claims, 22 Drawing Sheets

(56) References Cited

U.S. PATENT DOCUMENTS

| | | | | |
|---|---|---|---|---|
| 4,563,109 | A * | 1/1986 | Ortemond | E02B 17/00 24/514 |
| 7,703,358 | B2 * | 4/2010 | Ubinana Felix | E04G 17/04 249/219.2 |
| 8,720,841 | B2 * | 5/2014 | Morren | F16B 2/10 248/316.5 |
| 8,910,928 | B2 * | 12/2014 | Header | F16B 2/10 269/91 |
| 10,100,950 | B2 * | 10/2018 | Van Der Mik | F16L 3/1008 |
| 10,190,609 | B2 * | 1/2019 | Turturro | A61B 90/57 |
| 10,238,790 | B2 * | 3/2019 | Toro | A61M 5/14 |
| 10,428,975 | B2 * | 10/2019 | Nijdam | F16L 3/1041 |
| 10,697,482 | B2 * | 6/2020 | Turturro | F16B 2/10 |
| 2009/0139156 | A1 | 6/2009 | Magno, Jr. et al. | |
| 2020/0028338 | A1 * | 1/2020 | Kruzel | H02G 3/0456 |

FOREIGN PATENT DOCUMENTS

| | | |
|---|---|---|
| GB | 722084 | 1/1955 |
| GB | 758160 | 10/1956 |
| GB | 1096000 | 12/1967 |
| GB | 1213185 A | 11/1970 |
| GB | 2256672 A | 12/1992 |
| GB | 2284444 A | 6/1995 |
| GB | 2324568 A | 10/1998 |
| GB | 2339237 B | 1/2000 |
| GB | 2405900 A | 3/2005 |
| GB | 2473492 A | 3/2011 |
| JP | 2000197244 A | 7/2000 |

* cited by examiner

US 10,938,192 B2

CABLE CLEAT ASSEMBLY

CROSS REFERENCE TO RELATED APPLICATIONS

This application claims priority to U.S. Provisional Application No. 62/682,438, filed Jun. 8, 2018, the subject matter of which is hereby incorporated by reference in its entirety.

FIELD OF THE INVENTION

The present invention relates to cable cleats, and more particularly to a cable cleat for securing cables during a short circuit event.

BACKGROUND OF THE INVENTION

Cable cleats have been typically used to manage and secure 3-phase power cables of various sizes in a trefoil arrangement along a ladder rack or tray. The cable cleats secure the cables laterally and axially. The cable cleat must be rigid enough to retain cables during short circuit events, where electromagnetic forces can cause the cables to repel one another at extremely high forces. If a short circuit event occurs, the cables can separate when exposed to a large amount of force. Cable cleats are generally designed to resist the movement of cables during these short circuit events to prevent damage to people and property.

It is desirable to provide an improved cable cleat design that prevents movement of the cables during a short circuit event.

SUMMARY OF THE INVENTION

A cable cleat assembly secures a bundle of cables to a ladder rack. The cable cleat assembly includes a base and two side bodies. The base is secured to the ladder rack. The two side bodies are pivotally mounted to the ends of the base. Each side body has a first end, a middle section, and a second end. The first end of each side body includes a mounting member. The mounting member has a peg extending from each side of the mounting member. The pegs are mounted in the base to enable the side bodies to pivot from an open position to a closed position around the bundle of cables on the ladder rack.

DETAILED DESCRIPTION

Figure 1:
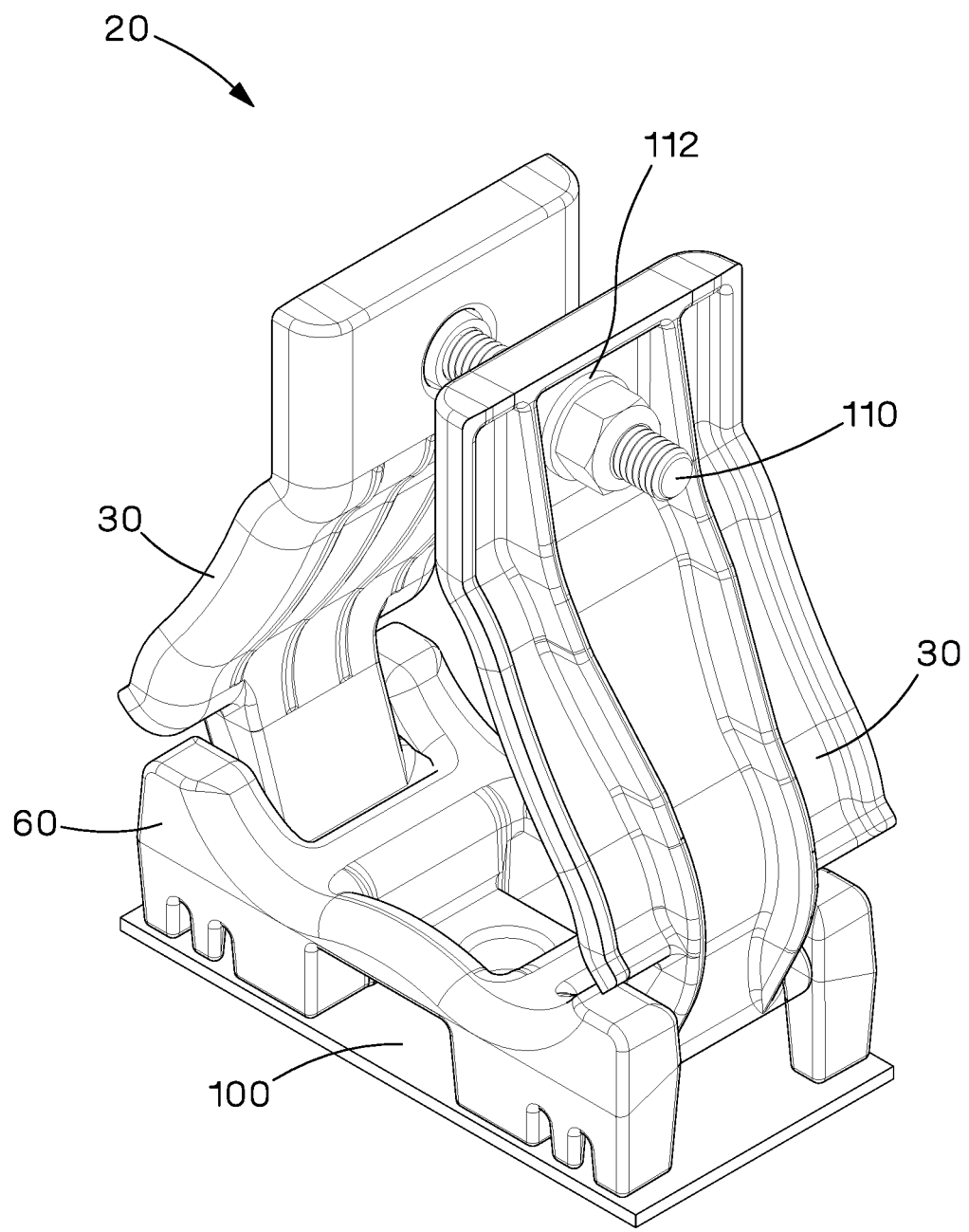
FIG. 1 is a perspective view of the cable cleat assembly of the present invention positioned on an insulating spacer.

FIG. 1 illustrates a perspective view of the cable cleat assembly 20 of the present invention. The cable cleat assembly 20 is a three-piece assembly held together in a triangular arrangement by a fastener 110, such as a clamping bolt. The cable cleat assembly 20 includes two side bodies 30 and a base 60.

Figure 2:
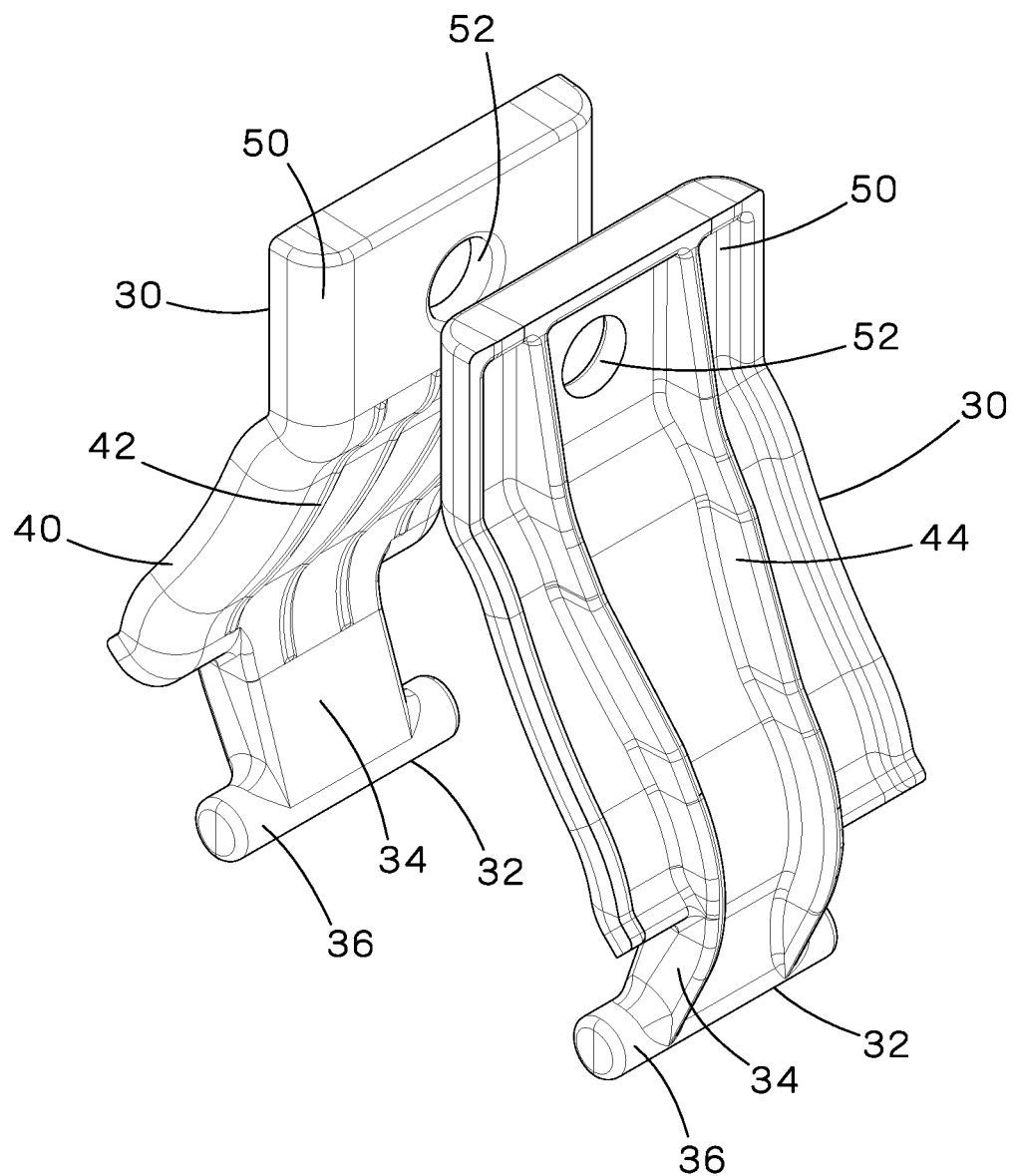
FIG. 2 is a perspective view of the side bodies of the cable cleat assembly of FIG. 1.

As illustrated in FIG. 2, each side body 30 includes a first end 32 including a mounting member. The mounting member is a narrow portion 34 with intrinsic pegs 36 extending outwardly therefrom. Each side body 30 includes a wider curved middle section 40 with securing ribs 42 located on the inner surfaces of the middle section 40. The securing ribs 42 hold the cables under axial loads when the cable cleat assembly 20 is installed. The side bodies 30 also include exterior flanges 44 extending from the outer surface of the middle section 40. The wider middle section 40 of the side bodies 30 leads to the second end 50. The second end 50 of each side body 30 is straight with a centered hole 52 for receiving a fastener 110, such as a clamping bolt.

Figure 3:
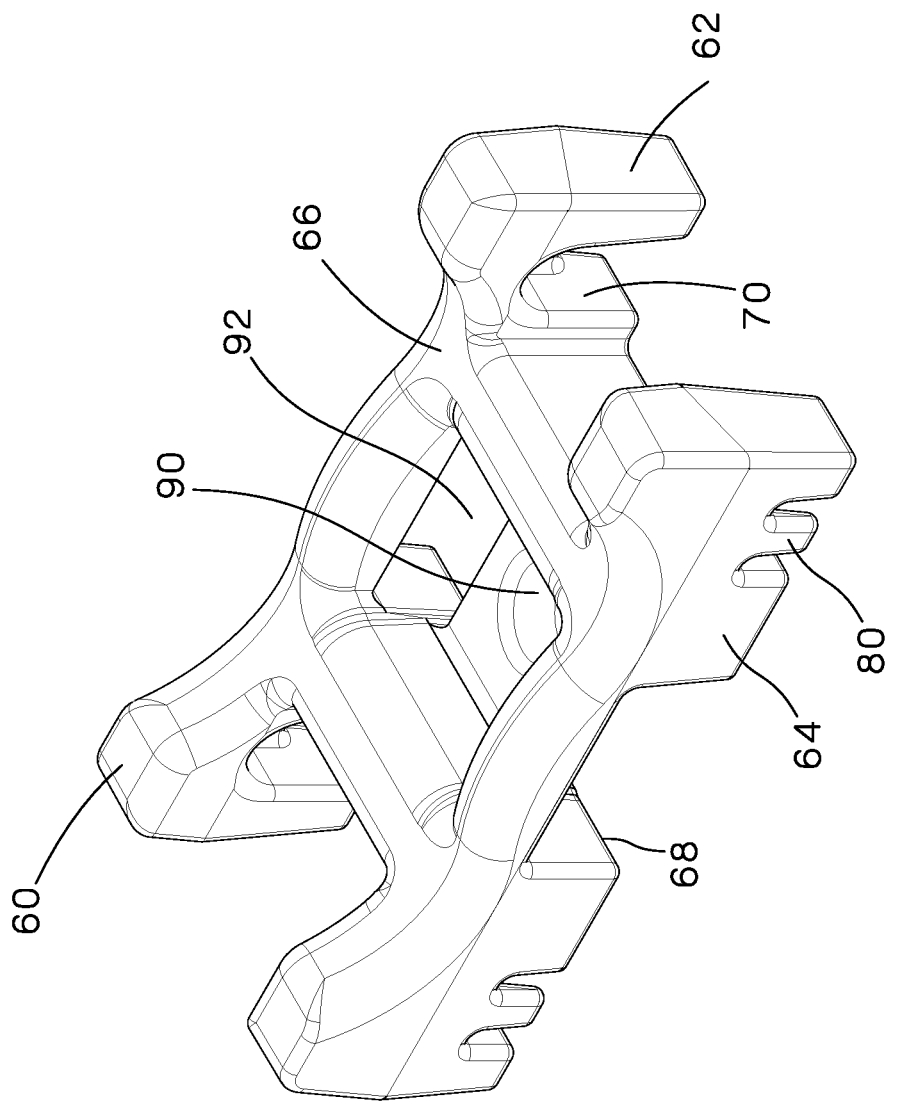
FIG. 3 is a perspective view of the base of the cable cleat assembly of FIG. 1.
Figure 4:
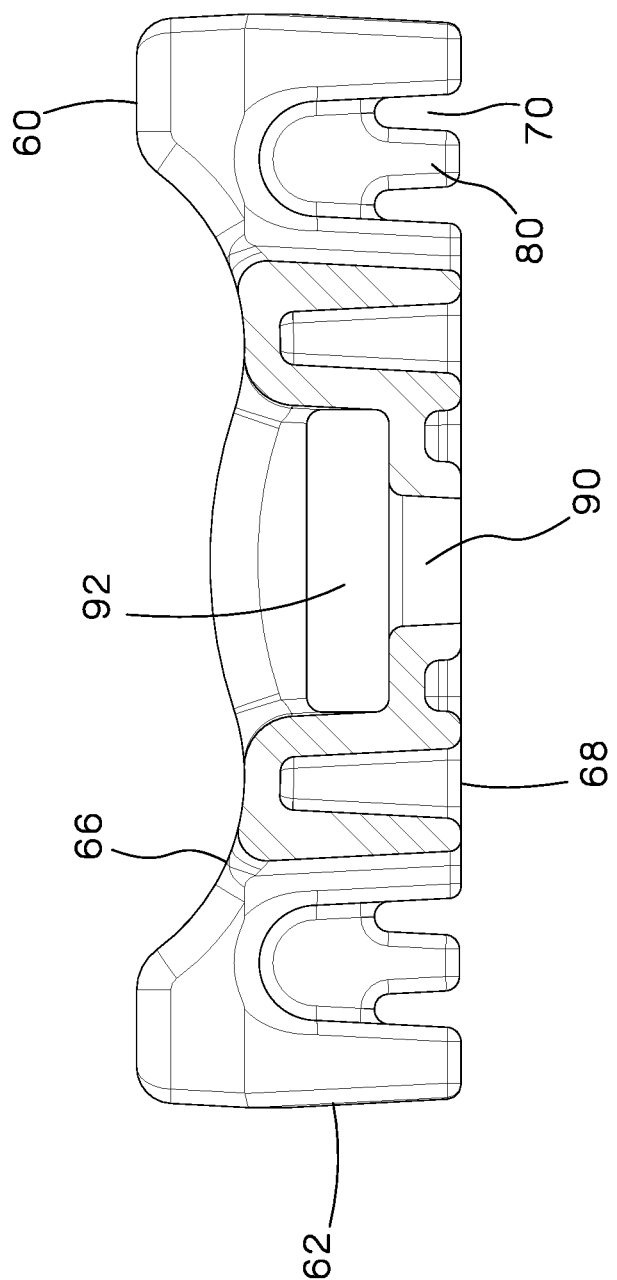
FIG. 4 is a front view of the base of FIG. 3.

FIGS. 3 and 4 illustrate the base 60 of the cable cleat assembly. The base 60 includes two open ends 62 with slots 70 that are accessible from the bottom 68 of the base 60. The sides 64 of the base 60 include a plurality of tabs 80 with each tab 80 positioned adjacent one of the slots 70.

Figure 5:
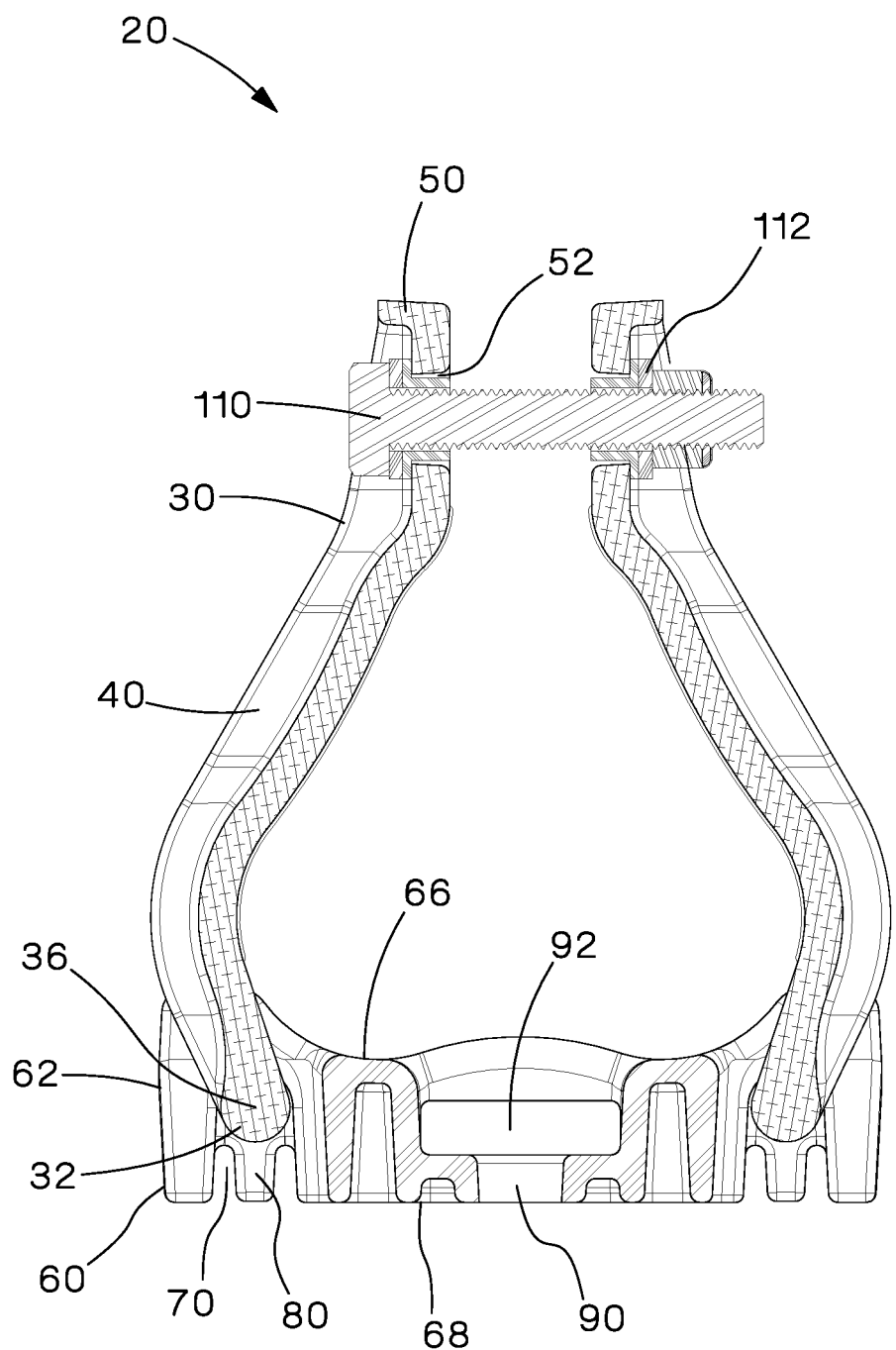
FIG. 5 is a front view of the cable cleat assembly of FIG. 1.

As illustrated in FIG. 5, the slots 70 in the base 60 are designed to mate with the intrinsic pegs 36 extending from the first end 32 of each side body 30. The intrinsic pegs 36 of each side body 30 slide into the slots 70 in the base 60 from the bottom 68 of the base 60.

Figure 6:
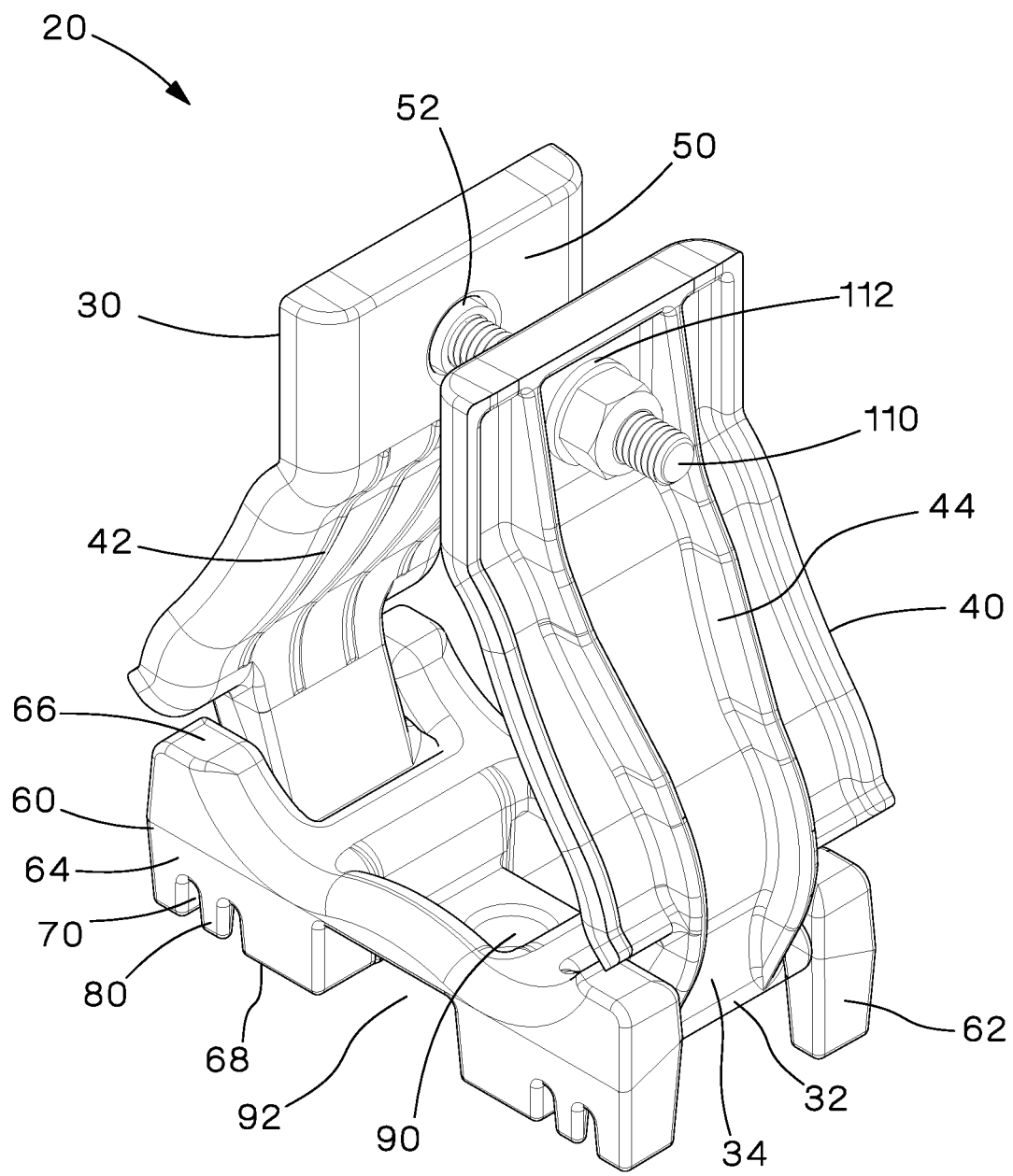
FIG. 6 is a perspective view of the cable cleat assembly of FIG. 1 with securing tabs.
Figure 7:
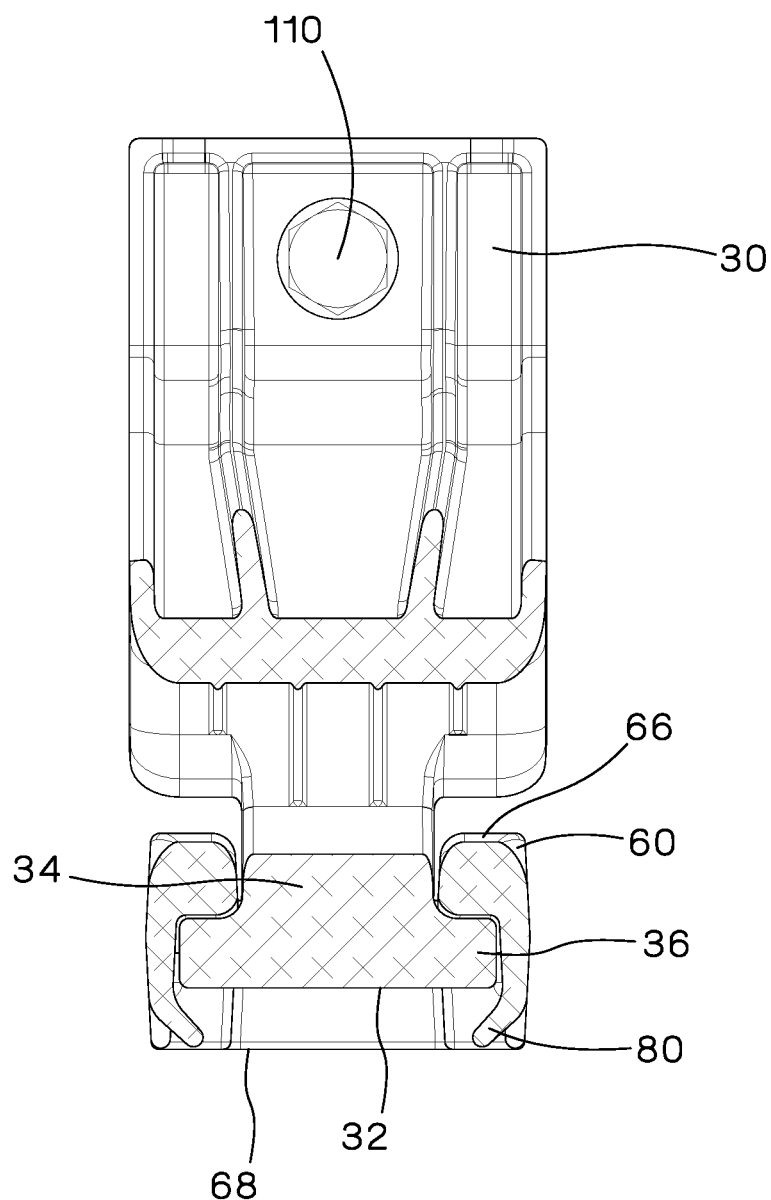
FIG. 7 is a sectional view of the cable cleat assembly of FIG. 1 with the securing tabs of the base bent into position.

As illustrated in FIGS. 6 and 7, the tabs 80 in the sides 64 of the base 60 are bent inward toward the center of the cable cleat to retain one of the intrinsic pegs 36 positioned in the slots 70 in the base 60. The bent tabs 80 hold the intrinsic pegs 36 in the slots 70 without additional fasteners.

The intrinsic pegs 36 act as a hinge enabling the side bodies 30 to rotate from an open position to a closed position around a plurality of cables. The double hinge feature allows the cable cleat assembly to accommodate a range of cable diameters. Once the side bodies 30 are pivoted to a closed position, the fastener 110 is positioned through the holes 52 in the second end 50 of each side body 30 to secure the cable cleat assembly.

The peg and slot design of the cable cleat assembly allows for simple manufacture with no side actions and minimal secondary processing thereby reducing production costs. Additionally, there is no need for a separate hinge, as with typical cable cleat designs thereby preventing issues with galvanic corrosion.

The base and side bodies of the cable cleat assembly are manufactured with a die-cast aluminum. However, the cable cleat assembly may also be manufactured from injection molded plastic or cast stainless steel.

The cable cleat assembly may include an insulating spacer 100 positioned between the cable cleat base and the ladder rack to prevent issues with galvanic corrosion. The cable cleat assembly may also include insulating washers 112 positioned in between the fasteners and the second end of the cable cleat.

FIGS. 8-11 illustrate the cable cleat assembly of the present invention securing cables to a ladder rack. The base 60 provides for both bolt and bracket securement methods to secure the cable cleat assembly to a ladder rack, or without securement as an intermediate cleat. As illustrated in FIGS. 3 and 4, the base 60 includes a top 66 with a hole 90 located at the center of the base. The hole 90 receives a fastener 130 to secure the base to a ladder rack 150 or tray (see FIGS. 8-9). The sides 64 of the base 60 include a bracket slot 92 located at the center of the base 60 between the tabs 80. The bracket slot 92 extends from one side 64 of the base 60 to the opposite side 64 of the base 60 over the hole 90. The bracket slot 92 is designed to receive a bracket 140 for mounting on a ladder rack 150 (see FIGS. 10-11). As illustrated in FIGS. 8-11, the cable cleat assembly is centered over the ladder rack with each securement method.

Figure 8:
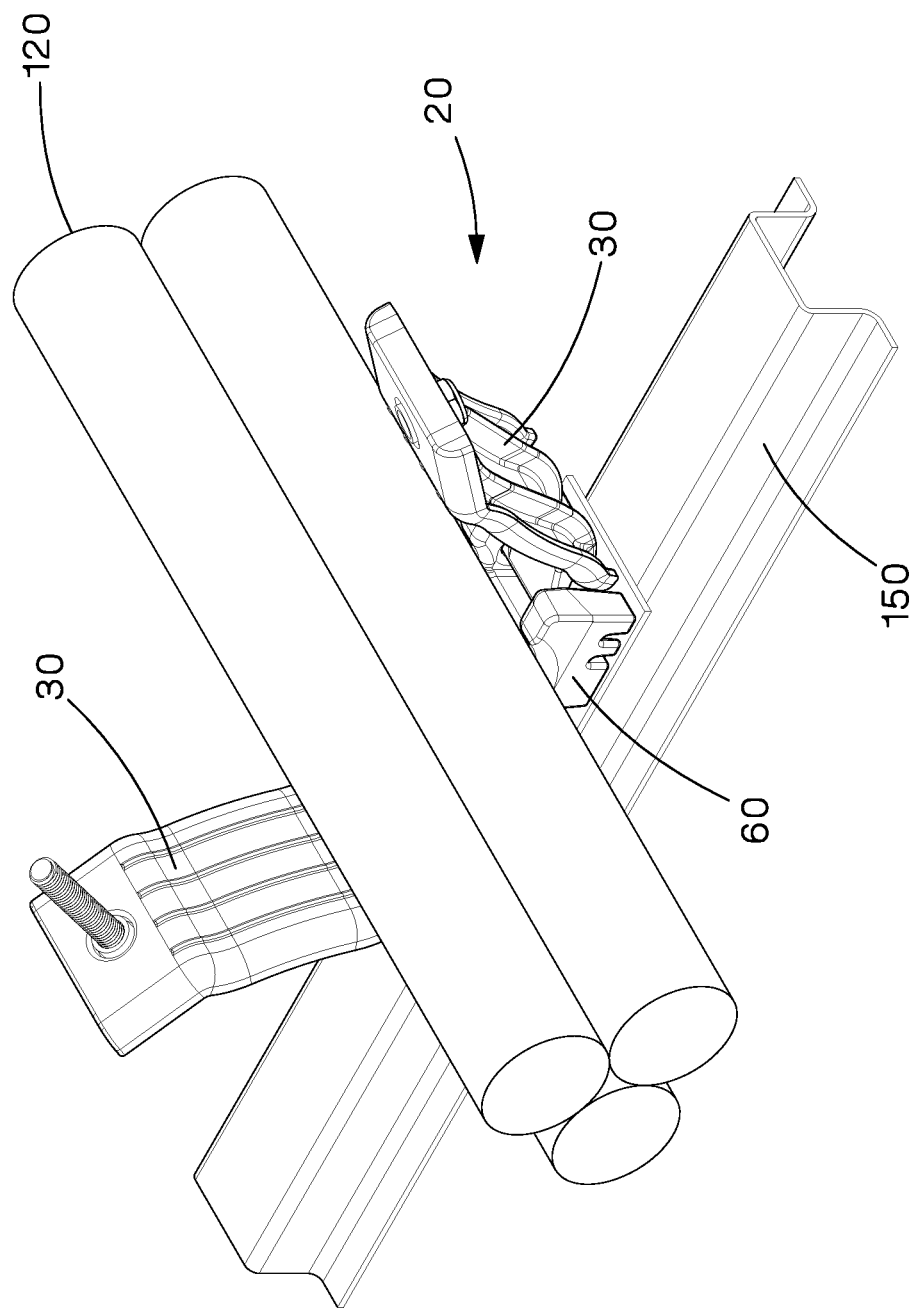
FIG. 8 is a perspective view of an open cable cleat assembly of FIG. 1 positioned on a ladder rack.
Figure 9:
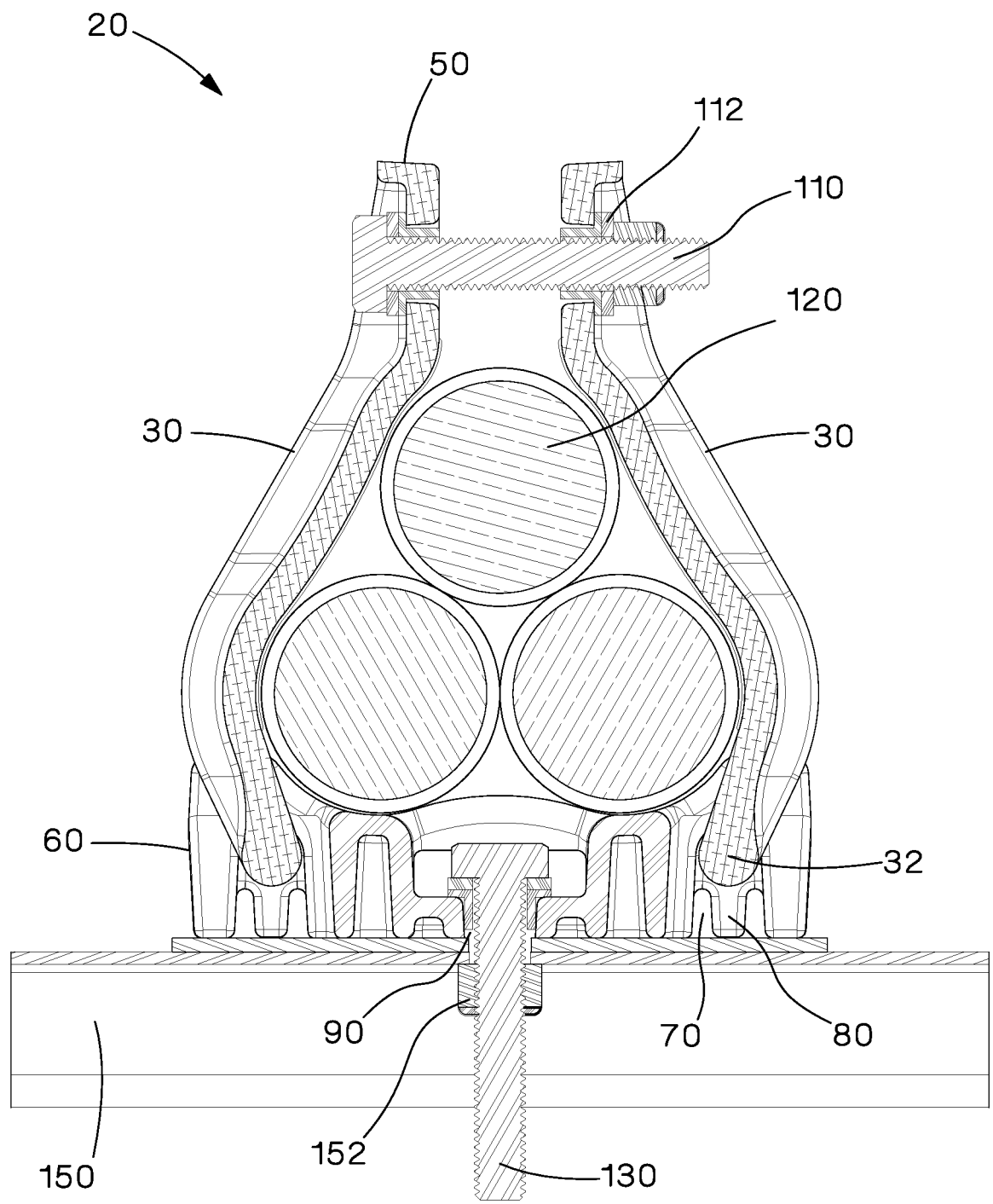
FIG. 9 is a sectional view of the cable cleat assembly of FIG. 1 installed around a trefoil cable arrangement and secured to a ladder rack by a fastener.

As illustrated in FIGS. 8-9, the cable cleat assembly 20 is installed directly on the ladder rack 150. The cable cleat assembly 20 is installed via a fastener 130, such as a mounting bolt. The cable cleat assembly 20 is installed onto the ladder rack 150 before the trefoil cables 120 can be placed on the base 60 of the cable cleat assembly 20 because access to the fastener 130 is required for typical installations in which the cables are positioned directly over fastener 130. Cables 120 are then individually placed in the cable cleat assembly 20, the side bodies 30 are pivoted to the closed positioned and fastened in place via fastener 110.

Figure 10:
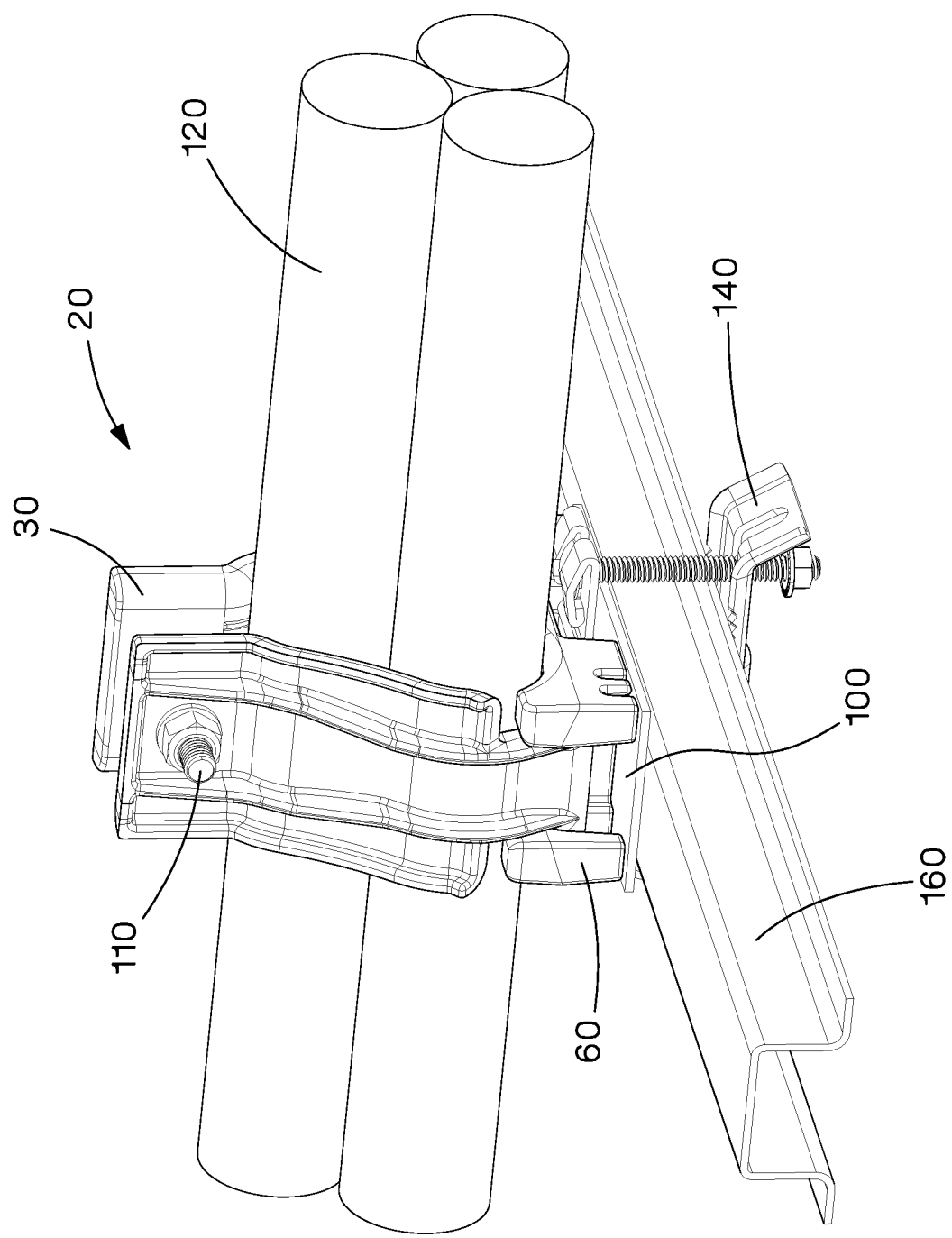
FIG. 10 is a perspective view of the cable cleat assembly of FIG. 1 secured to a ladder rack by a securing bracket.
Figure 11:
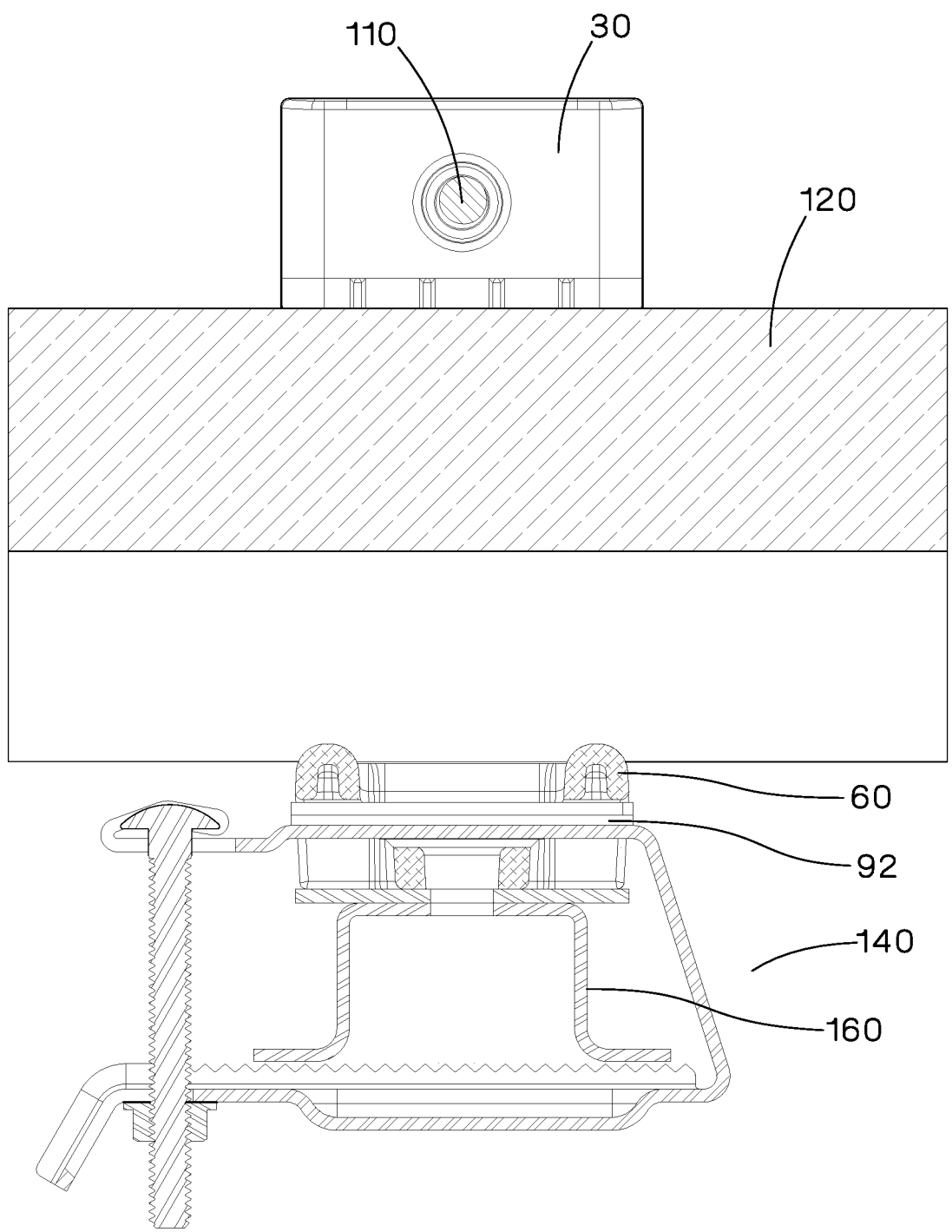
FIG. 11 is a sectional view of the cable cleat assembly of FIG. 10.
Figure 12:
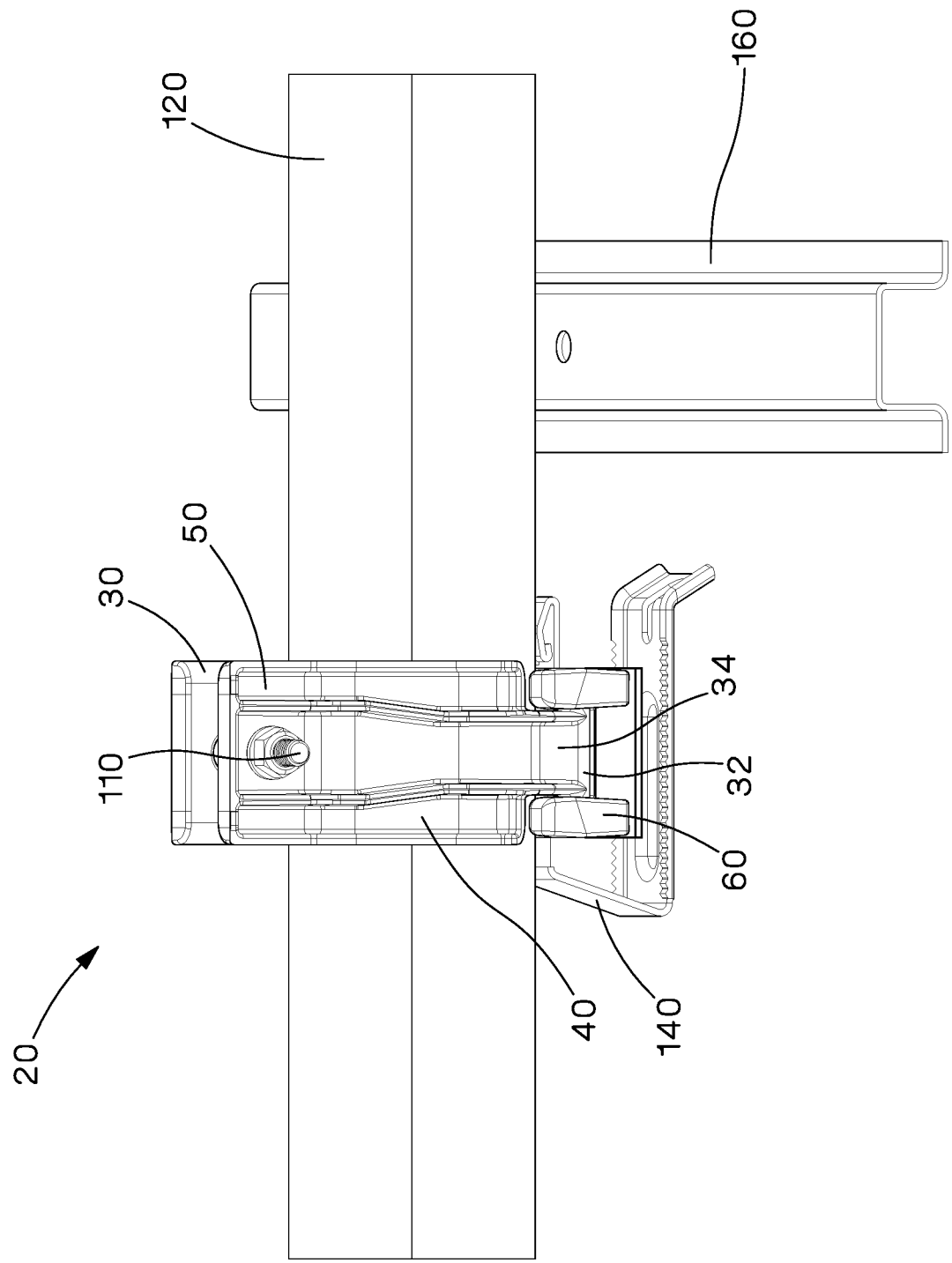
FIG. 12 is a perspective view of the cable cleat assembly of FIG. 10 secured to a bracket and positioned to be installed on a ladder rack.
Figure 13:
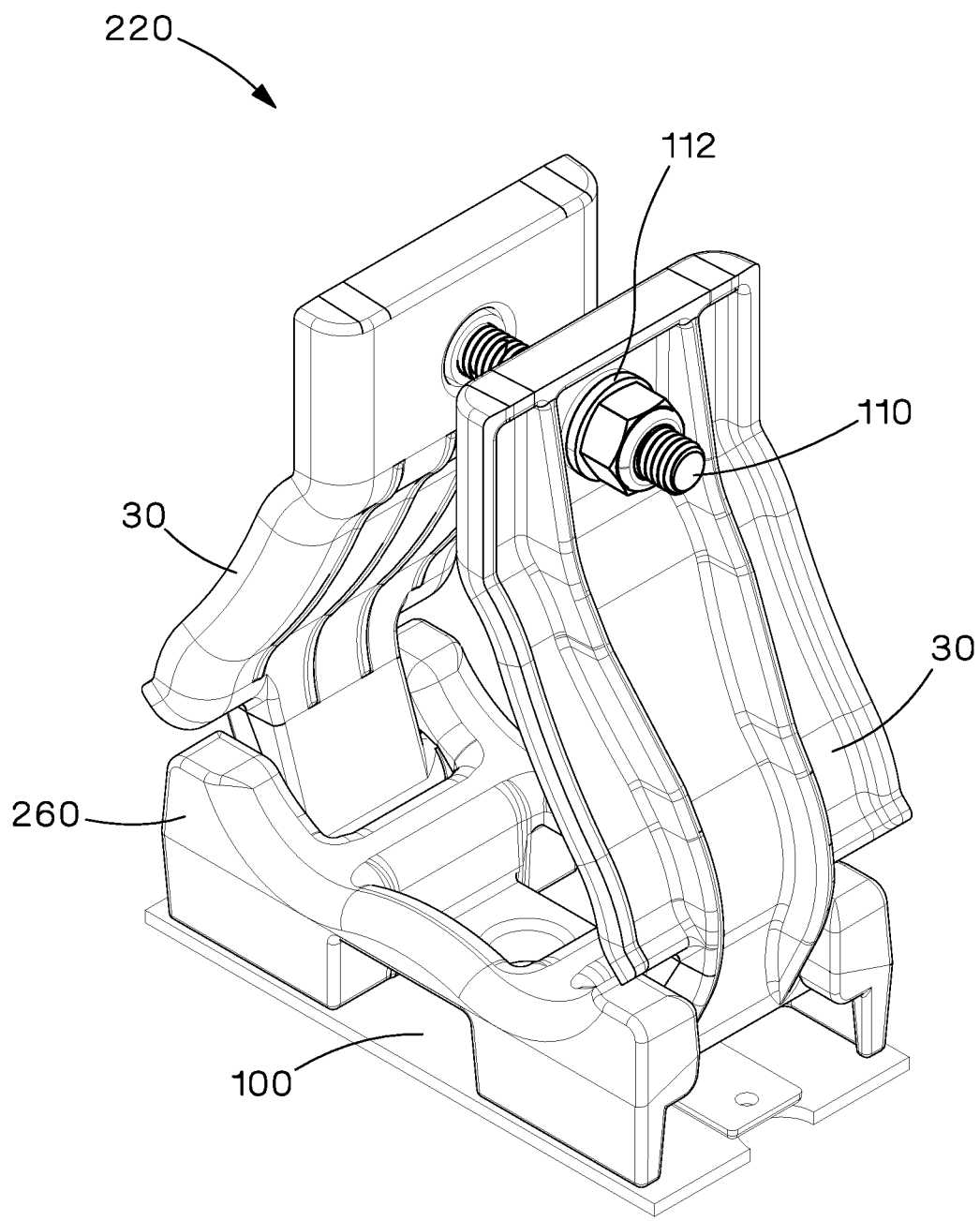
FIG. 13 is a perspective view of the cable cleat assembly with an alternative base positioned on an insulating spacer.

Alternatively, as illustrated in FIGS. 10-12, when there are no holes in the ladder rack 160, the cable cleat assembly 20 may be secured to the ladder rack 160 via bracket 140 that wraps around the ladder rack 160. When the cable cleat assembly 20 is attached via a bracket 140, the cable cleat assembly 20 may be assembled around existing trefoil cables 120 and then slid into place around the ladder rack 160 (see FIG. 12).

FIGS. 13-22 illustrate a cable cleat assembly 220. The cable cleat assembly 220 includes two side bodies 30 (see FIG. 2) and a base 260. The cable cleat assembly 220 is held together by a fastener 110, such as a clamping bolt.

Figure 14:
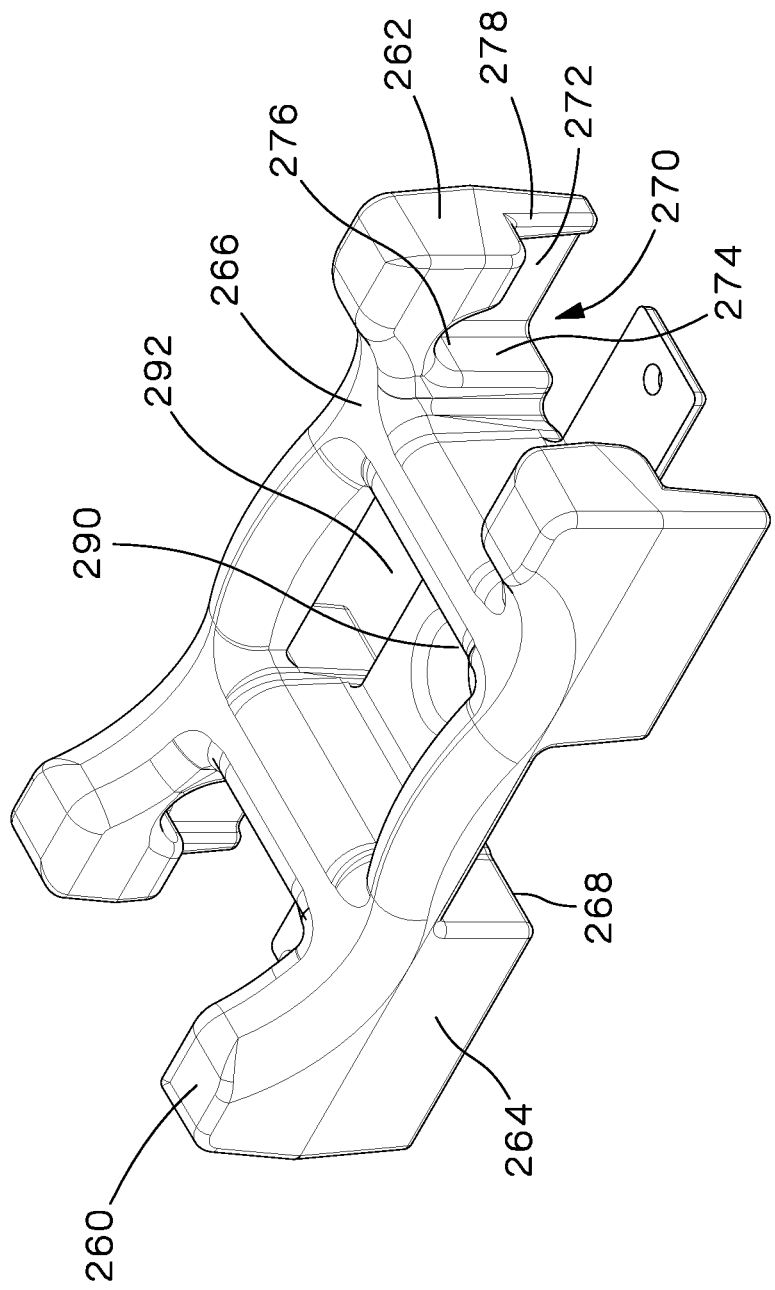
FIG. 14 is a perspective view of the base of the cable cleat assembly of FIG. 13.
Figure 15:
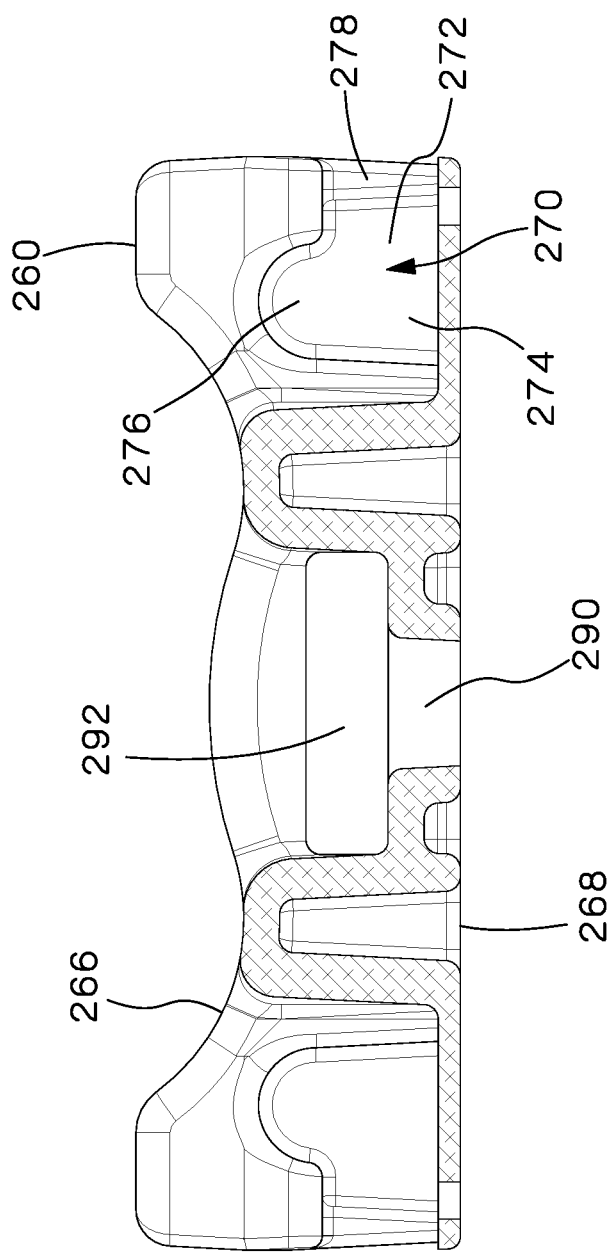
FIG. 15 is a sectional view of the base of FIG. 14.

The side bodies 30 in cable cleat assembly 220 are illustrated and described above with respect to FIG. 2. As illustrated in FIGS. 14-15, the base 260 includes two open ends 262, sides 264, a top 266, and a bottom 268. The open ends 262 provide access to slots 270. The slots 270 are defined by a horizontal portion 272, a vertical portion 274, and a semi-circular top portion 276. Tabs 278 are positioned at the open ends 262 to reduce access to the horizontal portion 272 of the slot.

Figure 16:
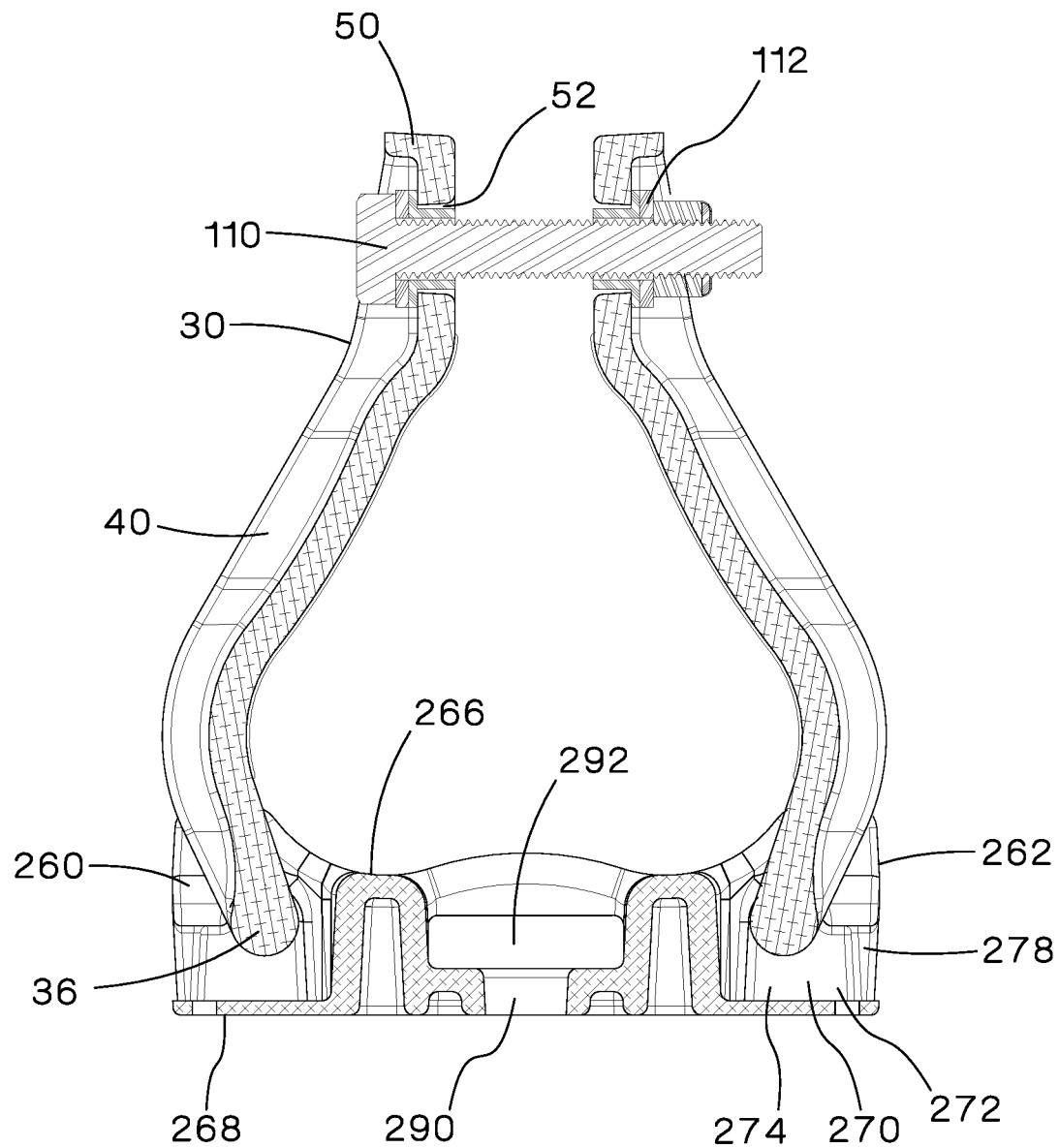
FIG. 16 is a sectional view of the cable cleat assembly of FIG. 13.

One of the side bodies 30 is press fit into one of the slots 270 in the base 260. The tabs 278 enable the side bodies 30 to be press fit into the base 260 and maintain the side bodies 30 in the slots 270 without additional fasteners. As illustrated in FIG. 16, the intrinsic pegs 36 that extend from the first end 32 of each side body 30 are positioned in the semi-circular top portion 276 of the slots 270.

The cable cleat assembly 220 may also include an insulating spacer 100 positioned between the cable cleat base and the ladder rack to prevent issues with galvanic corrosion. The cable cleat assembly may also include insulating washers 112 positioned in between the fasteners and the second end of the cable cleat.

Figure 17:
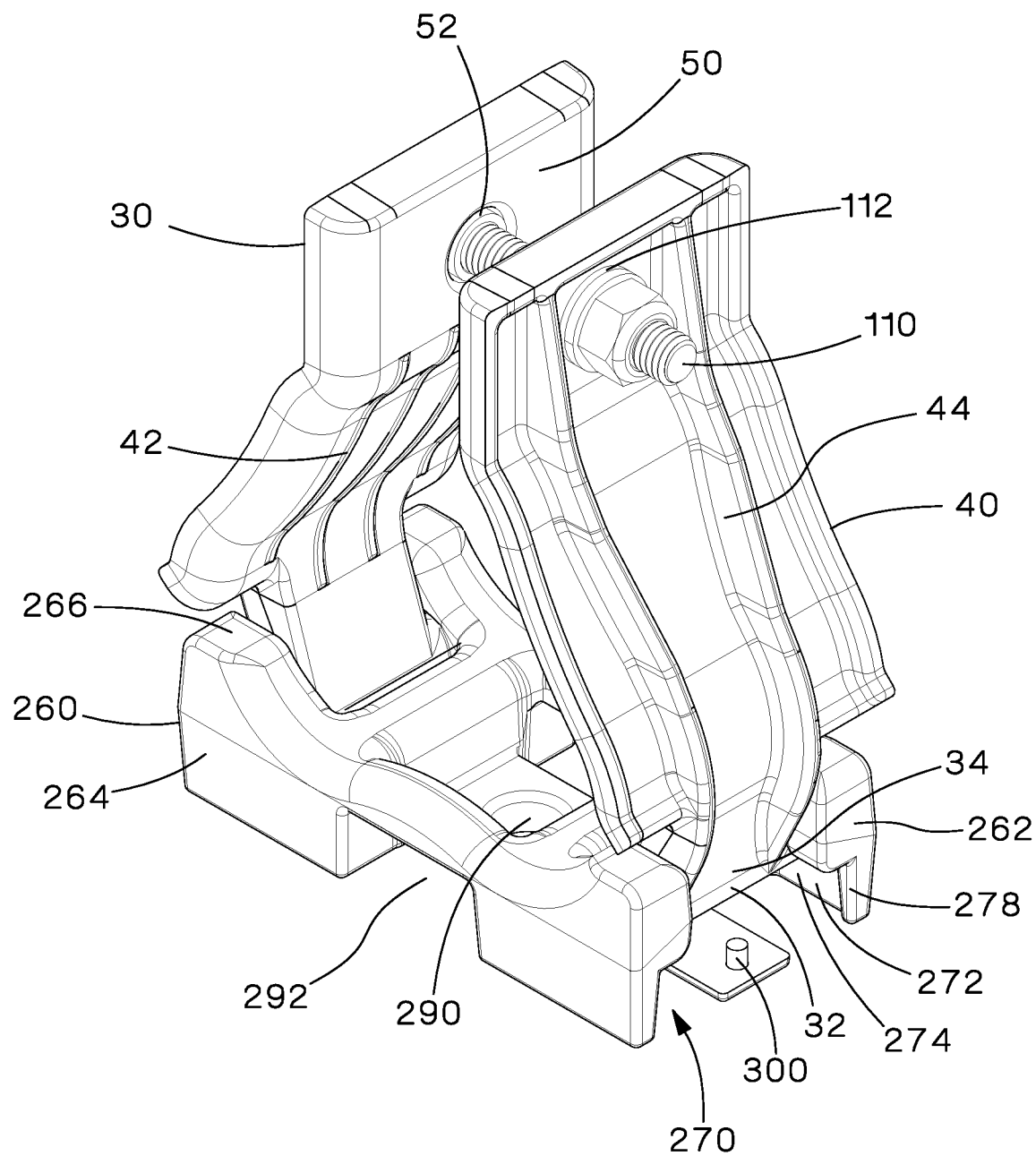
FIG. 17 is a perspective view of the cable cleat assembly of FIG. 13 with a blind rivet assembly.
Figure 18:
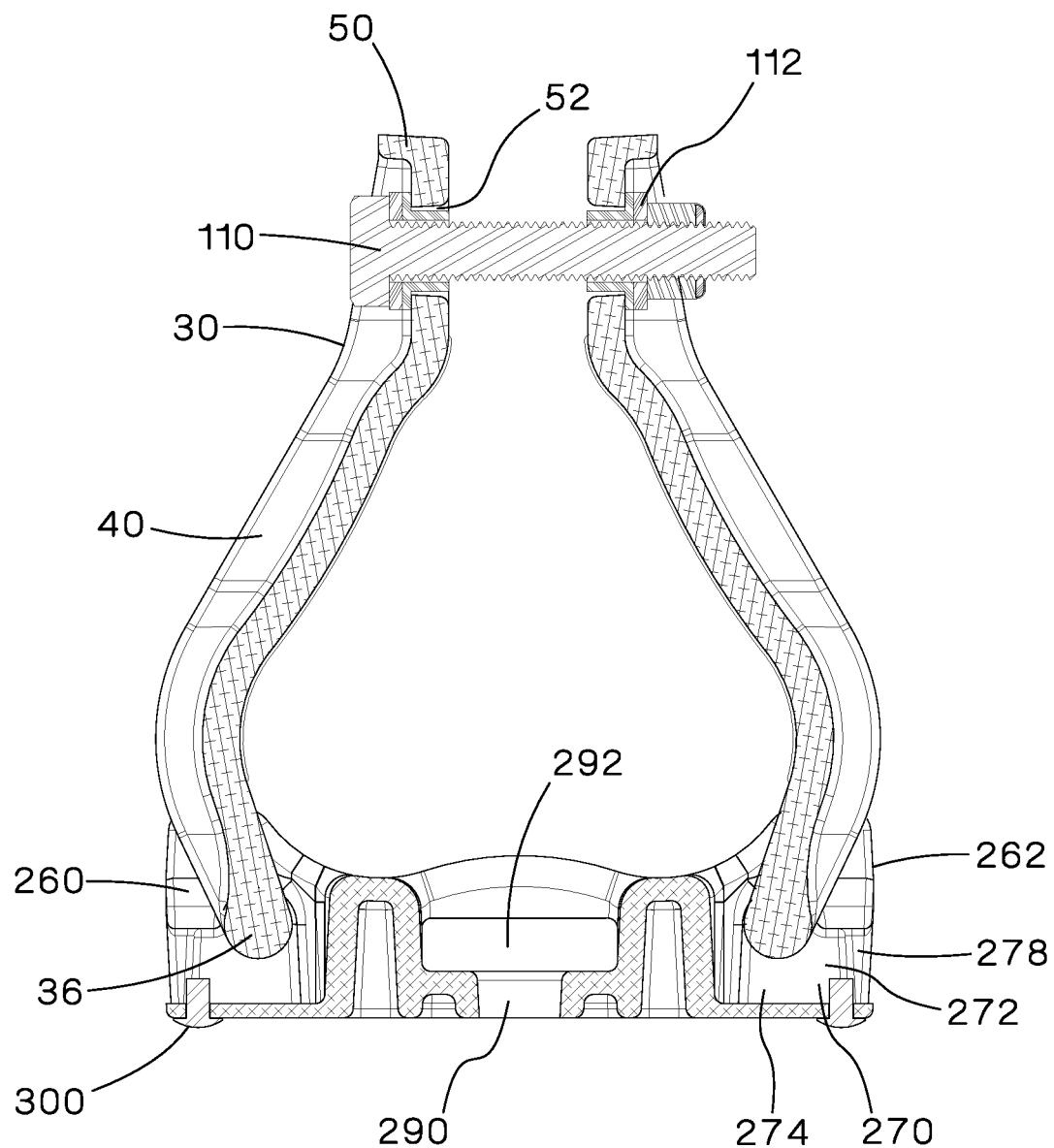
FIG. 18 is a sectional view of the cable cleat assembly of FIG. 17.
Figure 19:
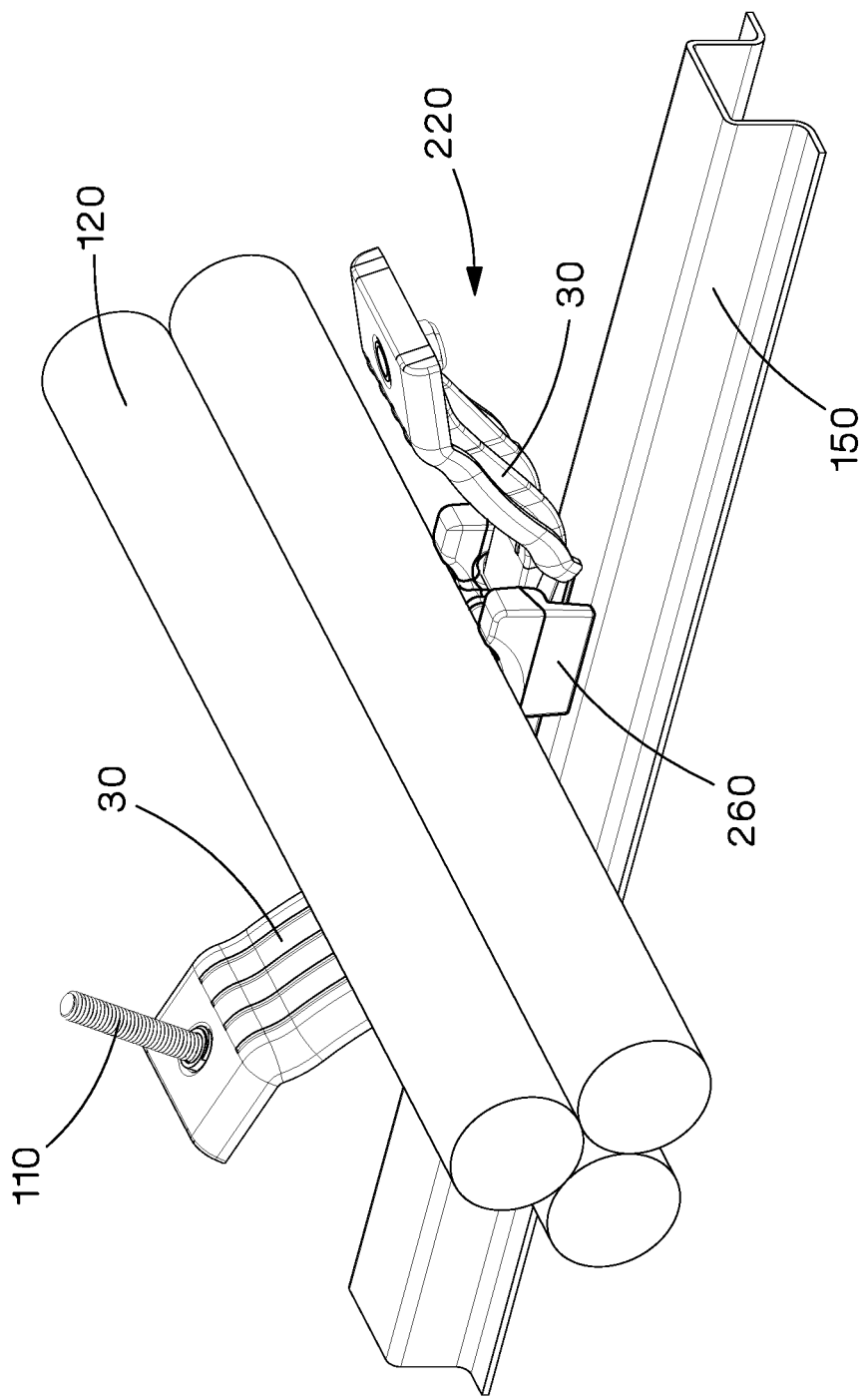
FIG. 19 is a perspective view of an open cable cleat assembly of FIG. 13 positioned on a ladder rack.
Figure 20:
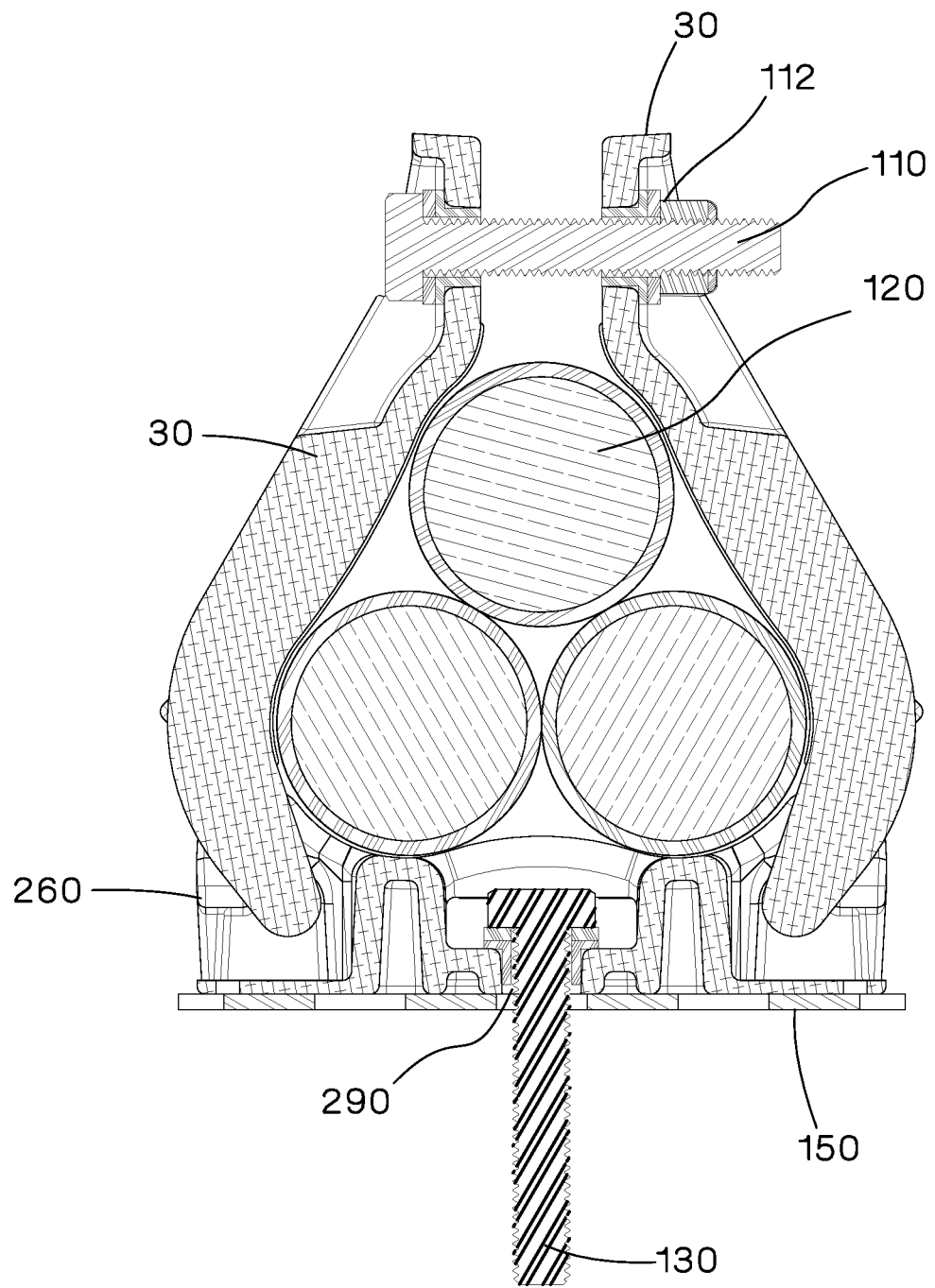
FIG. 20 is a sectional view of the cable cleat assembly of FIG. 13 installed around a trefoil cable arrangement and secured to a ladder rack by a fastener.
Figure 21:
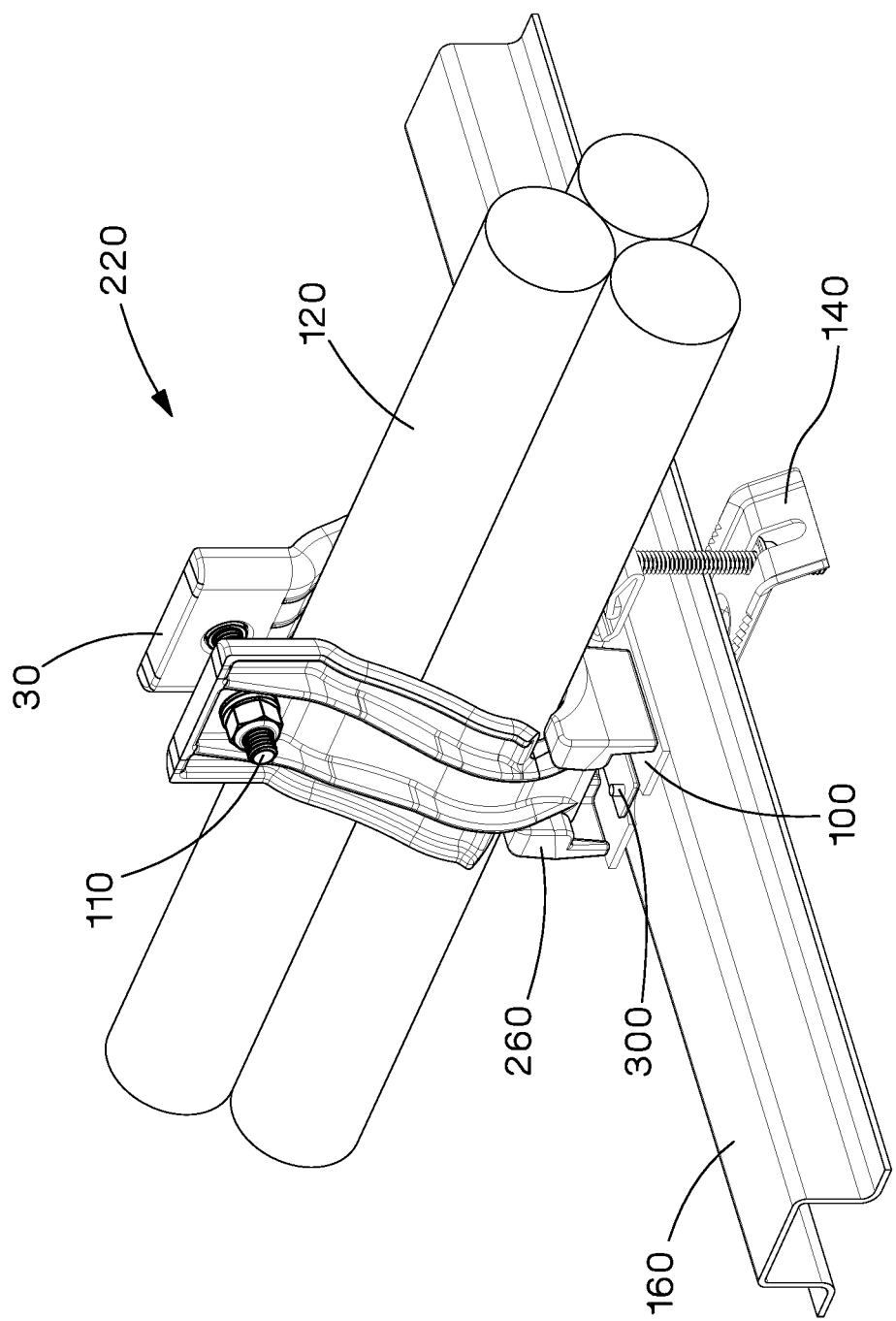
FIG. 21 is a perspective view of the cable cleat assembly of FIG. 13 secured to a ladder rack by a securing bracket.
Figure 22:
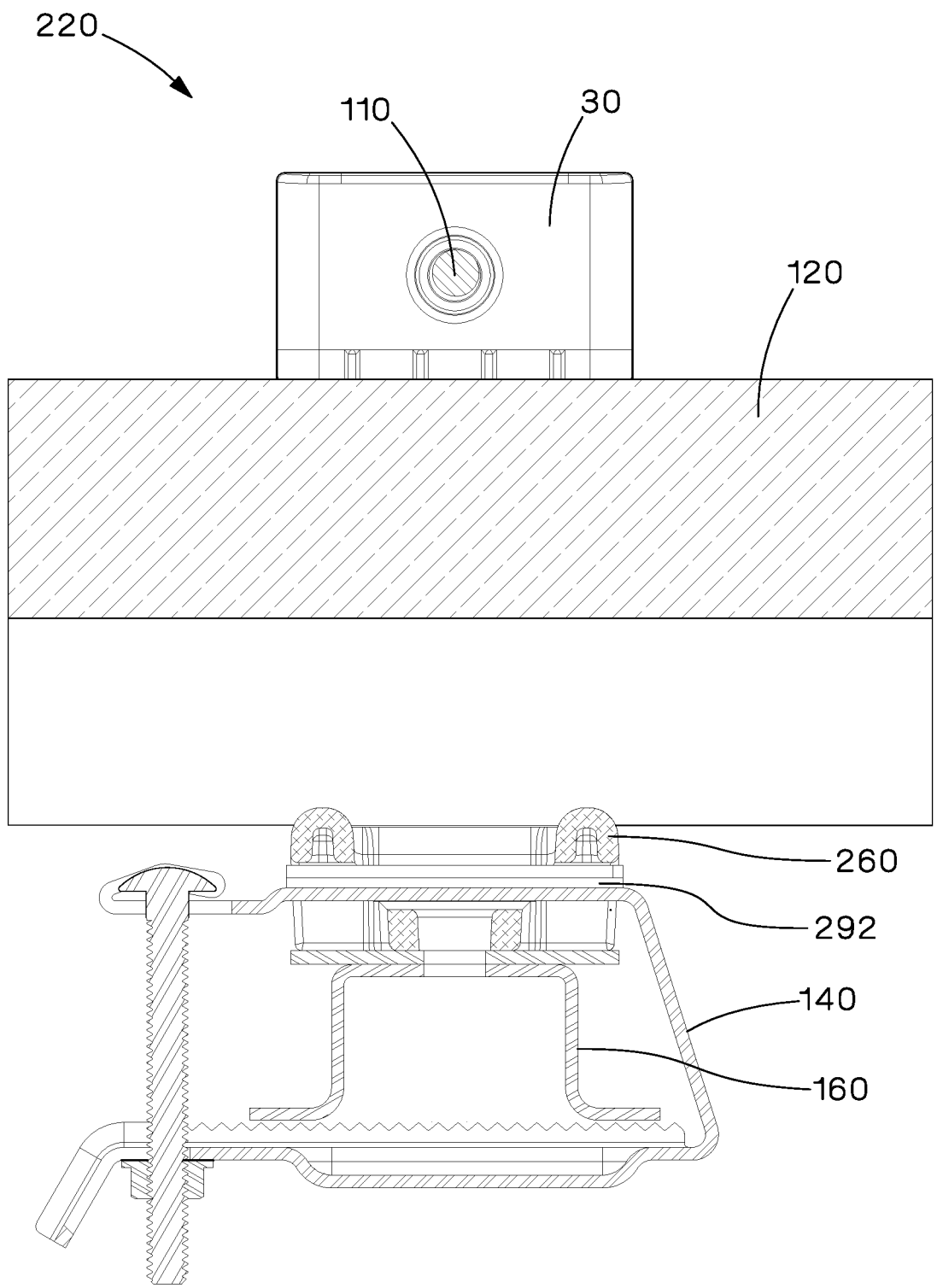
FIG. 22 is a sectional view of the cable cleat assembly of FIG. 21.

FIGS. 17 and 18 illustrate the cable cleat assembly 220 with blind rivets 300. The blind rivets 300 may be used, if desired, to assist with the press fit of the side bodies 30 by containing the side bodies 30 within the base 260 while being installed.

As discussed above, the intrinsic pegs 36 act as a hinge enabling the side bodies 30 to rotate from an open position to a closed position around a plurality of cables 120. The double hinge features allows the cable cleat assembly 220 to accommodate a range of cable diameters. Once the side bodies 30 are pivoted to a closed position, a fastener 110 is installed through the holes 52 in the second end 50 of each side body 30 to secure the cable cleat assembly 220.

FIGS. 19-22 illustrate the cable cleat assembly 220 securing cables 120 to a ladder rack 150, 160. The base 260 provides for both bolt and bracket securement methods to secure the cable cleat assembly 220 to a ladder rack 150, 160.

As illustrated in FIGS. 14-15, the base 260 includes a hole 290 located at the center of the base 260. A fastener 130 is received in the hole 290 to secure the base 260 to a ladder rack 150 (see FIGS. 19-20).

Also illustrated in FIGS. 14-15, the base 260 includes a bracket slot 292 that extends from one side 264 of the base 260 to the opposite side 264 of the base 260. The bracket slot 292 is designed to receive a bracket 140 for mounting on a ladder rack 160 (see FIGS. 21-22).

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable cleat assembly for securing cables to a ladder rack, the cable cleat assembly comprising:
   a base;
   two side bodies, each side body is pivotally mounted to the base;
   wherein each side body has a first end, a middle section, and a second end; each first end has a mounting member, the mounting member having a peg extending from each side of the mounting member;
   wherein the base includes a top, a bottom, sides, and two open ends; and
   wherein the base includes slots for holding the pegs of each side body, the pegs of each side body are snapped into the slots to secure the side body to the base.

2. The cable cleat assembly of claim 1, wherein the pegs of each side body are mounted in the base to enable the side body to pivot from an open position to a closed position.

3. The cable cleat assembly of claim 1, wherein the middle section of each side body has securing ribs located on an inner surface of the middle section.

4. The cable cleat assembly of claim 3, wherein the securing ribs maintain the cables under axial loads when the cable cleat assembly is installed.

5. The cable cleat assembly of claim 1, wherein the second end of each side body includes a hole for receiving a fastener to secure the side bodies in a closed position.

6. The cable cleat assembly of claim 1, wherein the slots are defined by a horizontal portion, a vertical portion, and a semicircular portion.

7. The cable cleat assembly of claim 1, wherein the sides of the base include tabs that bend inward to engage one of the pegs of the side body.

8. The cable cleat assembly of claim 1, wherein the ends of the base include tabs for enabling the pegs of the side bodies to be press fit into the base.

9. The cable cleat assembly of claim 1, wherein the base includes a rivet for maintaining the side bodies within the base.

10. The cable cleat assembly of claim 1, further comprising a fastener for securing the base to the ladder rack.

11. The cable cleat assembly of claim 1, further comprising a bracket for securing the base to the ladder rack.

12. A cable cleat assembly for securing cables to a ladder rack, the cable cleat assembly comprising:
   a base;
   two side bodies, each side body is pivotally mounted to the base;
   wherein each side body has a first end, a middle section, and a second end; each first end has a mounting member, the mounting member having a peg extending from each side of the mounting member; and
   wherein the base includes a top, a bottom, sides, and two open ends, the ends of the base include tabs for enabling the pegs of the side bodies to be press fit into the base.

* * * * *